Nov. 3, 1953  M. CASTRICUM  2,657,573
APPARATUS FOR TESTING FLEXIBLE MEMBERS
Filed Sept. 22, 1948  2 Sheets-Sheet 1

INVENTOR
MARTIN CASTRICUM
BY
Henry P. Truesdell
ATTORNEY

Nov. 3, 1953  M. CASTRICUM  2,657,573
APPARATUS FOR TESTING FLEXIBLE MEMBERS
Filed Sept. 22, 1948  2 Sheets-Sheet 2
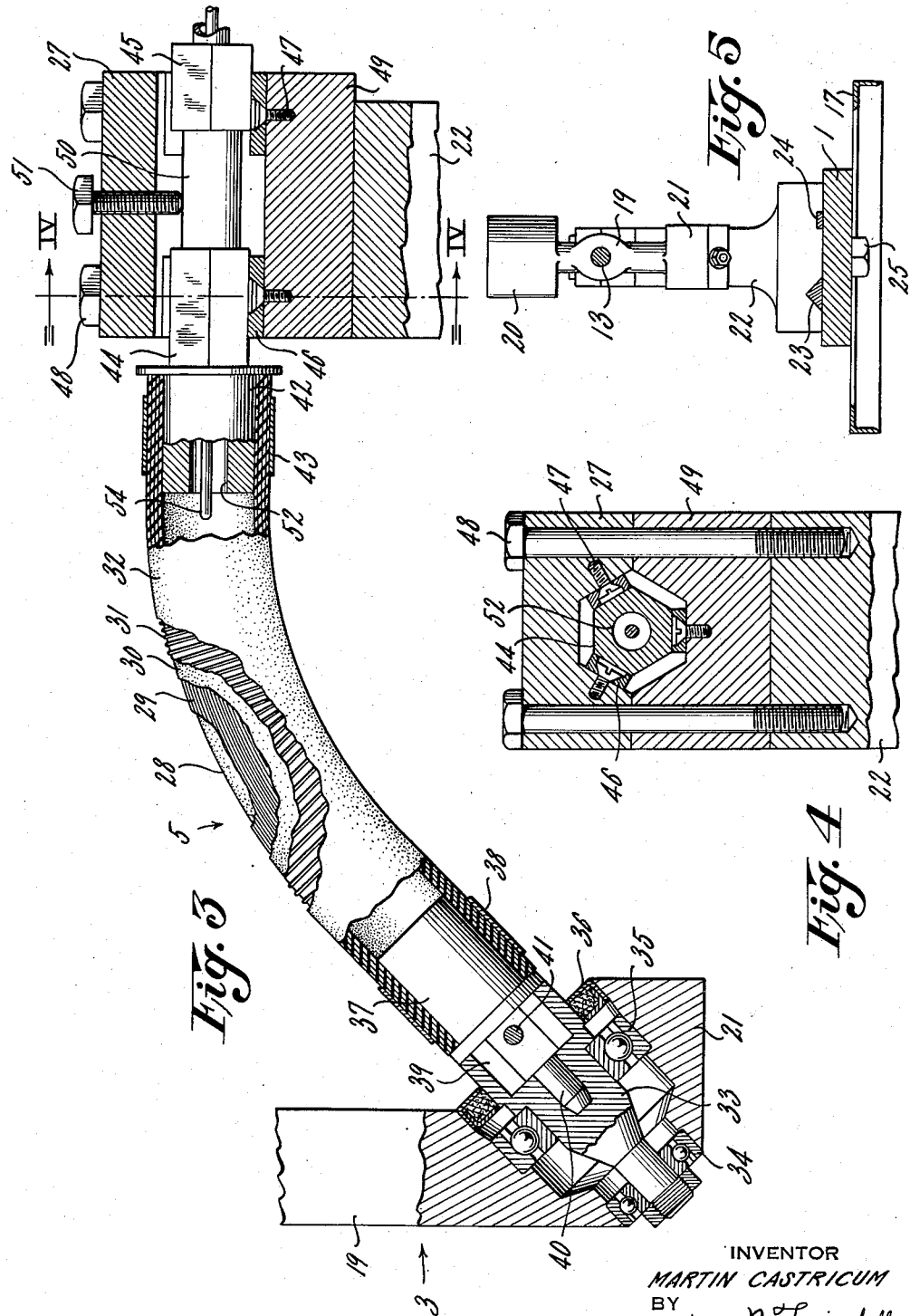
INVENTOR
MARTIN CASTRICUM
BY
Henry P. Truesdell
ATTORNEY Patented Nov. 3, 1953

2,657,573

UNITED STATES PATENT OFFICE 2,657,573

APPARATUS FOR TESTING FLEXIBLE MEMBERS

Martin Castricum, Grosse Pointe, Mich., assignor to United States Rubber Company, New York, N. Y., a corporation of New Jersey Application September 22, 1948, Serial No. 50,543

1 Claim. (Cl. 73—100)

This invention relates to an apparatus for testing and, in particular, it relates to a method and apparatus for testing flexible elements such as tire components.

In general, my invention comprises an apparatus for testing resilient materials by incorporating the material to be tested in the wall of a resilient sleeve, inflating the sleeve and subjecting the wall of the sleeve to successive, compressive and tension stresses by bending the sleeve and simulating axial rotation of the sleeve without, however, actually axially rotating the sleeve.

Materials which may be tested in accordance with the present apparatus and method include various resilient or flexible compositions such as rubber or synthetic rubber, or textiles embedded in rubber, or combination tests of rubber and textiles. The apparatus, herein described, is particularly applicable for testing components of pneumatic tires.

It is recognized that somewhat similar devices have been disclosed such, for example, as the patent to Ray, No. 2,235,622 of March 18, 1941, and the patent to Mallory, No. 2,412,524 of December 10, 1946. In each of these cases, it is noted that the tubular member is subjected to axial rotation.

In accordance with the practice of my invention and for the reasons hereinafter stated, I find that it is not desirable to axially rotate the tubular member. In the first place, inflation of the member is required and it is more desirable to attach a fluid pressure connection to a relatively stationary inflatable sleeve than to a sleeve that is axially rotatable. Also, it is possible to attach to the sleeve devices such as a thermocouple for determining temperatures during operation. A further advantage of my invention is that there is less torsional strain in the tubular member thus permitting a more accurate determination of the tension and compressive stresses on the test sample which simulate more closely the fatigue conditions to which tire components are subjected while in operation.

These and other objects and advantages will appear more fully in the following detailed description when considered in connection with the accompanying drawing in which:

Figure 3 is an enlarged view, partly in section, of a test sleeve and its end connections;

Figure 4 is a transverse view, in section, taken along lines IV—IV of Figure 3, illustrating the means for preventing axial rotation of the tubular member; and, Figure 5 is a transverse view, in section, illustrating an end view of a counterbalanced rotating head for inducing stresses in the cords of the tubular sleeve, the section being taken along line V—V of Figure 2.

Figure 1:
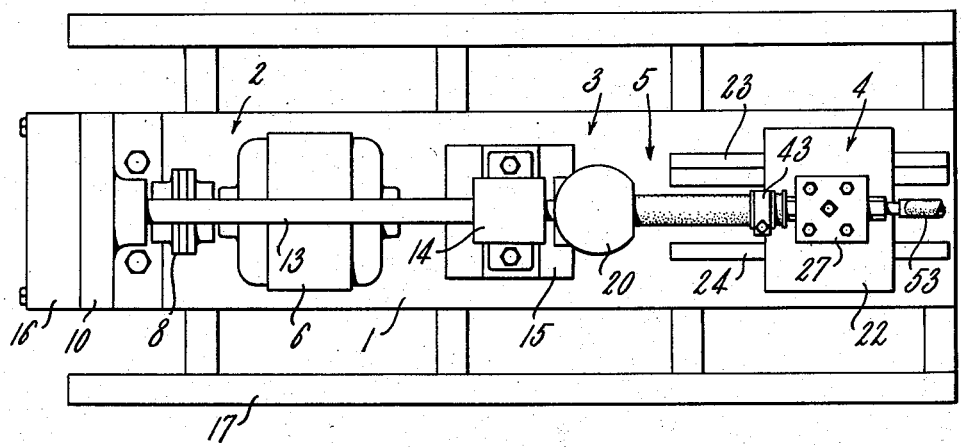
Figure 1 is a plan view of a testing machine constituting an embodiment of my invention.
Figure 2:
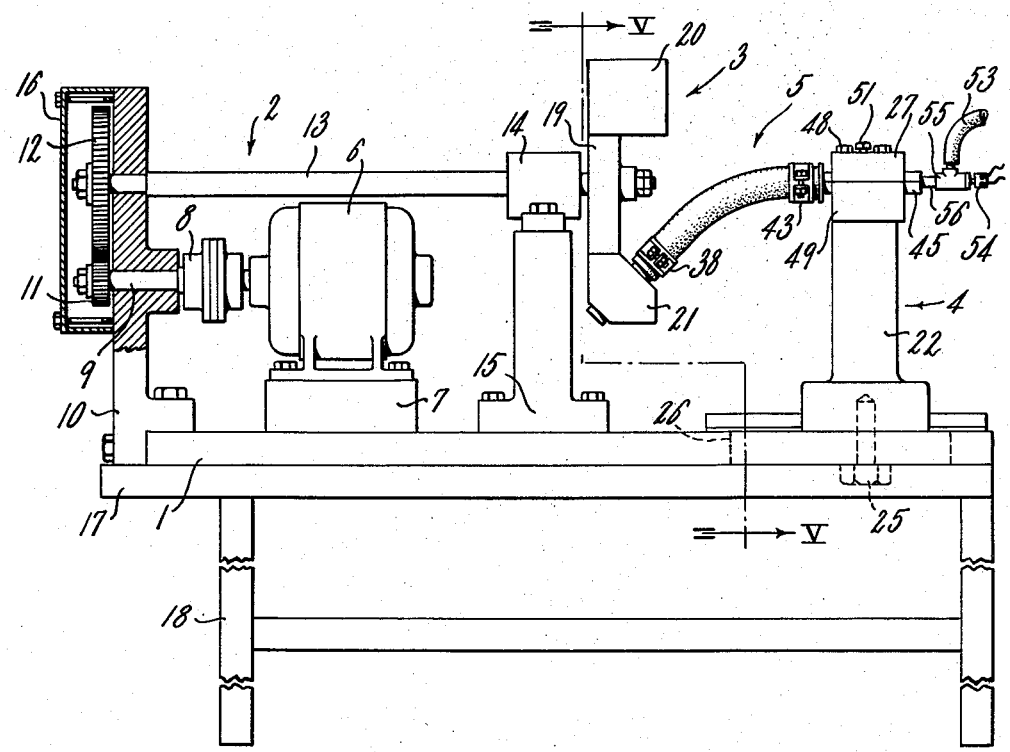
Figure 2 is a side elevational view thereof, partly in section.

With reference to the drawing and, in particular, to Figures 1 and 2, I show one form of the apparatus of my invention comprising essentially a base member 1, a drive mechanism 2, a counterbalanced drive head 3, an adjustable tail stock 4, and a test unit 5.

The driving mechanism 2 includes a motor 6 supported from the base 1 by a spacer block 7. A coupling 8 connects the motor 6 with a shaft 9 supported by a bracket 10 attached to the base 1. A pinion 11 mounted on the shaft 9 meshes with a gear 12 attached to a drive shaft 13. The opposite end of the drive shaft 13 is supported by a bearing 14 which in turn is supported from the base 1 by an upright 15. A cover 16 acts as a guard for the gears 11 and 12. The entire mechanism is mounted on a table top 17 supported by a frame-like structure 18.

The drive head 3 includes an arm 19 keyed to the shaft 13. At one end of the arm is a counterbalance 20 and the other end of the arm includes a block 21 to which the test sleeve is attached as hereinafter described.

The tail stock 4 comprises essentially an upright bracket 22 adjustably moveable relative to the length of the base member 1 and resting on slide-ways 23 and 24. A machine screw 25 extending through a slot 26 in the base member 1 serves as means for clamping the upright bracket 22 with the base member 1. A cap 27 is attached to the upright bracket 22 and serves to retain the tubular test member as hereinafter more particularly described.

When the machine is used for testing cords, the cords, as shown in Figure 3, are embedded in a tubular sleeve 5 of rubber or synthetic rubber. This sleeve is of the general appearance of a length of rubber hose having an internal diameter of approximately 1½ inches. The innermost layer of the tubular member is a wall 28 of rubber composition. This wall has a thickness of approximately .050 inch and is similar in composition to the rubber stock usually associated with tire cords in the carcass of a pneumatic tire. The second layer of the tubular member is a layer 29 of cord fabric similar to the cord fabric of a tire. These are the cords to be tested and they are assembled within the tubular member so that the direction of the cords extends longitudinally of the length of the tubular member.

In accordance with conventional practice, the cords 29 are first dipped in a solution such as latex and subsequently a skim coat of rubber composition is applied to each side of the cords. Ordinarily these cords are spaced apart to the extent of approximately 28 ends per inch depending on the diameter of the cord. It is to be understood, however, that the spacing of the cords may cover a wide range and may include, if desired, a single cord along the length of the test piece. The third layer consists of a sheet 30 of carcass stock similar to the first layer. However, the thickness of the layer 30 may be increased to approximately .075 inch.

In order to resist inflation pressure, a spiral wrapping 31 of cords is formed around the layer 30. This spiral wrapping is usually formed of cotton cords spaced apart to the extent of 13 or 14 cords per inch. An outer protective layer 32 of carcass stock of a thickness of approximately .025 inch completes the assembly of the tubular member. It is to be understood that the test cords which are incorporated in the tubular member may be any of the conventional textile elements, including cotton, rayon, nylon or they may consist of wire cables used in wire tires.

As shown in Figure 3, the block 21 forming a part of the drive head serves to connect the drive head with the tubular member 5. To accomplish this a shaft 33 is supported in the block 21 by means of ball bearings 34 and 35. A grease retaining ring 36 completes the connection. Attached to the shaft 33 is an extension connector 37 onto which the tubular member 5 is attached by means of a clamping ring 38. The connector 37 joins the shaft 33 by means of an extension 39 which is hexagonal in cross-sectional shape and by means of a pilot projection 40. A pin 41 locks the two members 33 and 37 together.

The opposite end of the tubular member 5 is supported by a shaft 42 and a clamping ring 43. Portions 44 and 45 of the shaft 42 are hexagonal in cross section and are supported by a plurality of flat slide-blocks 46 adapted to contact the flat surfaces of the hexagonal portions 44 and 45. The purpose of these slide-blocks is to allow an axial movement for adjustment of the tubular member 5 while at the same time to prevent radial or rotational movement of the tubular member. Machine screws 47 attach the slide-blocks 46 to the tail stock 4. Bolts 48 complete the tail stock assembly by clamping the cap 27 with the upward extending bracket 22 including an extension block 49 interposed between the cap 27 and the bracket 22.

Between the hexagonally shaped portions 44 and 45 shaft 42 is provided with an undercut portion 50 which, in combination with a lock screw 51 extending through the cap 27 serves to restrict axial movement of the shaft 42. A bore 52 extends through the shaft 42 and engages with a flexible hose 53 to be connected to a means for supplying fluid pressure. Also extending through the aperture 52 is a thermocouple tube 54. This tube extends part way into the chamber of the sleeve 5 and is adapted to record the temperature of the air within the sleeve. The opposite end of the thermocouple joins in air tight engagement with a conduit fitting 55, to which the air hose 53 is connected, and which is connected to the bore of the shaft by means of a conduit 56.

It is to be understood that the test unit 5 may be subject to various modifications, the principal requirement being that the test unit is resilient of flexible. When the apparatus is used for testing resilient materials as distinguished from cords, the outer layer 32 of the wall of the tubular member may be of thicker stock to suit the test conditions. Also, the outer layer may have a pattern or design embossed thereon such as the tread pattern of any of the conventional pneumatic tires. In this way, the test may be used for the determination of cracking at the base of the grooves defining the surface pattern. In testing various material compositions, the test unit may be formed with or without the longitudinal or helical embedded cords, or the unit may be used with the helical cords only. Thus, it is evident that the apparatus of my invention may be used with various flexible test units.

In the operation of the apparatus, a tubular member is made up as described, containing the particular materials to be tested. This tubular member is mounted on the shafts 37 and 42 and clamped in place. To accomplish this the tail stock may be moved back and forth for proper positioning and the final adjustment of the set screw 51 is made so as to remove any longitudinal strain on the test unit. Thereafter the tubular member is inflated with a constant pressure of approximately 60 pounds per square inch. Ordinarily the drive head operates to rotate the head at approximately 600 R.P.M. It is to be understood, however, that various inflation pressures and various speeds of rotation may be utilized to suit a particular test. During the rotation of the head, a peculiar movement is imparted to the tubular member. The member does not rotate axially, but one end of the tubular member is rotatably retained and driven in a circular path so as to obtain the same bending stresses which would take place if the tubular member were axially rotated in a bent condition.

In the testing operation, the tubular member 5 may be bent to any desired degree from 0 to 90°. The preferred practice, however, is to bend the tubular member to approximately 45° as shown in the drawing. The time in which a failure occurs in the test unit depends upon the type of material being tested. An approximate lapse of time before failure is about nine hours, when testing cords.

While I have shown a preferred apparatus of practicing my invention, it is to be understood that other forms of apparatus may be used within the spirit of the invention, and as appearing within the scope of the appended claim.

Having thus described my invention what I claim and desire to protect by Letters Patent is:

Apparatus for testing a flexible tubular test piece comprising, a stationary support, a hollow shaft rigidly secured to said support, one end of said hollow shaft extending from said support whereby one end of said tubular test piece may be slid over said one end of the hollow shaft, means for tightly clamping said one end of said tubular test piece on said one end of said hollow shaft, means for introducing fluid under pressure through said hollow shaft into said tubular test piece, an arm rotatably mounted for movement in a plane perpendicular to the axis of said hollow shaft and about an axis which is in alignment with the axis of said hollow shaft but spaced a substantial distance from said hollow shaft, a solid shaft mounted for free rotation on said arm at a point spaced from the axis of rotation of said arm and extending from said arm whereby the other end of said tubular work piece may be slid over the end of said solid shaft, means for tightly clamping said test piece on said solid shaft, and means for rotating said arm.

MARTIN CASTRICUM.

References Cited in the file of this patent

UNITED STATES PATENTS

| Number | Name | Date |
|---|---|---|
| 1,512,063 | Sproull | Oct. 21, 1924 |
| 2,235,622 | Ray | Mar. 18, 1941 |
| 2,318,506 | Lovell | May 4, 1943 |
| 2,412,524 | Mallory | Dec. 10, 1946 |

FOREIGN PATENTS

| Number | Country | Date |
|---|---|---|
| 530,418 | Great Britain | Dec. 11, 1940 |